April 8, 1952
J. L. TRANT
2,592,492
REVERSIBLE MOTOR
Filed March 23, 1949
2 SHEETS—SHEET 1
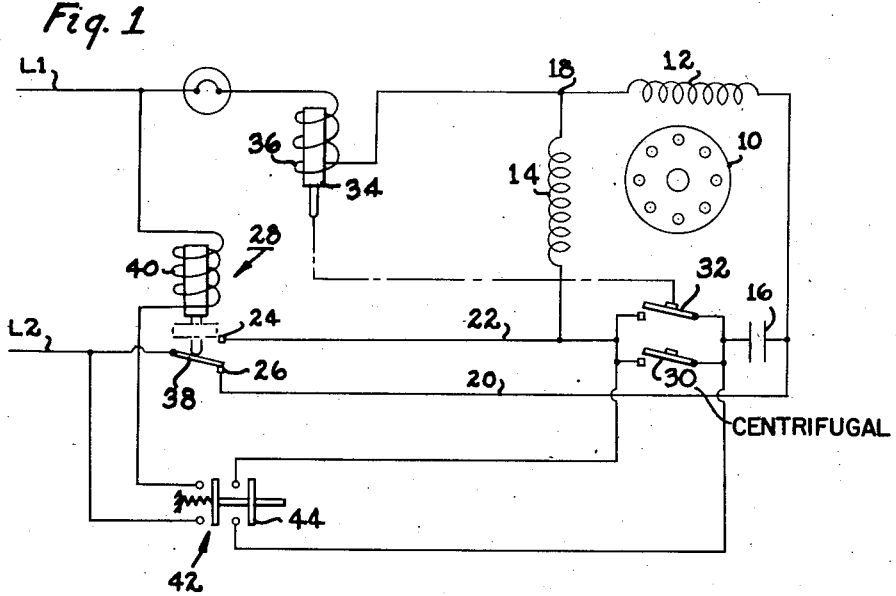
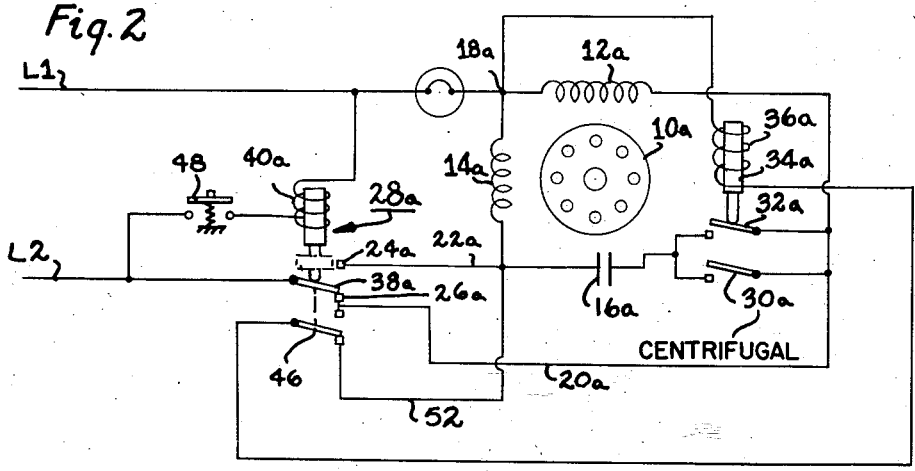
INVENTOR
JAMES L. TRANT
BY
Toulmin & Toulmin
ATTORNEYS.

April 8, 1952     J. L. TRANT     2,592,492
REVERSIBLE MOTOR
Filed March 23, 1949     2 SHEETS—SHEET 2
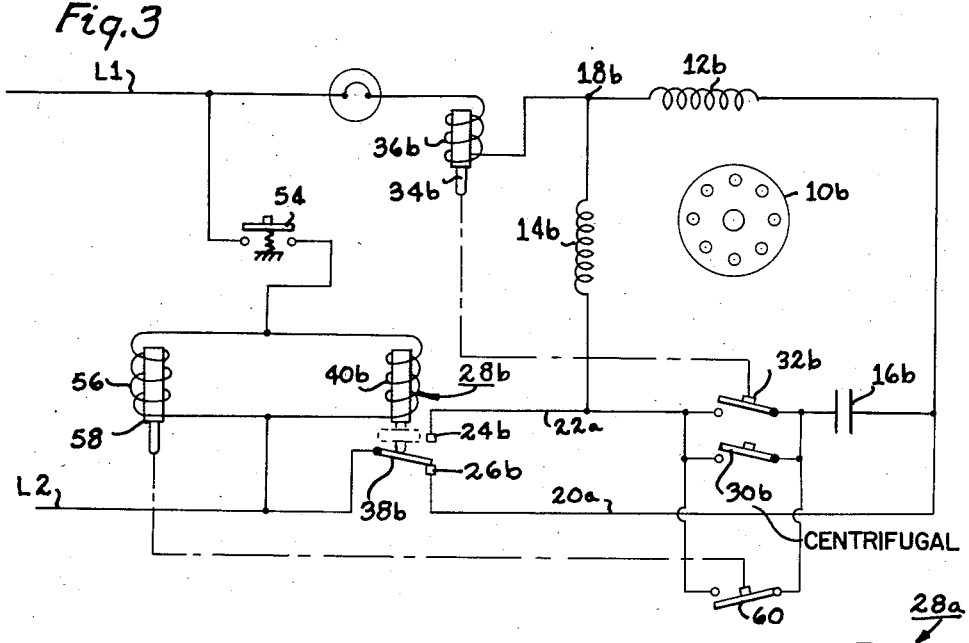
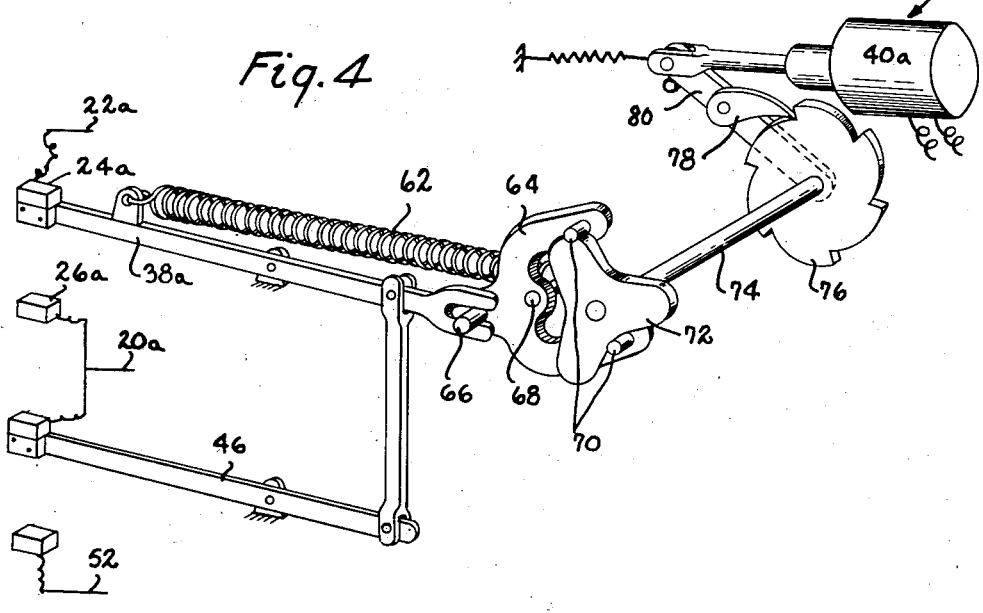
INVENTOR
JAMES L. TRANT
By Toulmin & Toulmin
ATTORNEYS Patented Apr. 8, 1952

2,592,492

UNITED STATES PATENT OFFICE 2,592,492

REVERSIBLE MOTOR

James L. Trant, Dayton, Ohio, assignor to The Brown-Brockmeyer Company, Dayton, Ohio, a corporation of Ohio Application March 23, 1949, Serial No. 83,031

2 Claims. (Cl. 318—203)

1

This invention relates to electric motors and particularly to single phase motors arranged so as to be reversible.

One of the most common types of single phase motors is the squirrel cage split phase starting type. A motor of this nature has a squirrel cage rotor and a field consisting of a main and an auxiliary or starting winding and a reactance in series with the auxiliary winding. This reactance may be resistive, inductive, or capacitative in nature, but generally takes the form of a capacitor, due to the advantages obtained from the use of this form of reactance. Such motors ordinarily include a centrifugal switch in series with the auxiliary winding and reactance and operable at a predetermined motor speed for opening the circuit through these elements of the field. Thus, in starting, the rotor is driven by a revolving field, and when the motor is running, the field is single phase and pulsating.

It will be evident from the foregoing that such a motor can have its direction of rotation reversed only by first bringing it to a halt, and then modifying its circuit so the reactance gives the opposite direction of field rotation during the starting period. Due to the relatively high inertia of the rotating parts of the motor, a substantial period of time will elapse before the motor will come to a halt upon being de-energized unless it is connected with a load which will act as a brake. In many instances where it is desirable for the motor to be of a reversible nature, the load which it drives is comparatively light and cannot be depended on to bring the motor to a halt in a very short time.

Having the foregoing in mind, the primary object of the instant invention is to provide an arrangement for substantially instantaneously reversing the direction of rotation of a split phase motor.

Another object is the provision of a control circuit for a split phase motor such that de-energization of the motor will bring about a rapid braking thereof to a reduced speed condition.

A still further object is the provision of a control circuit in connection with a split phase motor which is operable during operation of the motor for effecting the substantially instantaneous reversing thereof.

These and other objects and advantages will become more apparent upon reference to the following description taken in connection with the accompanying drawings in which:

Figures 1, 2, and 3 are diagrammatic electrical layouts showing three different adaptations of my invention to a split phase motor; and

2

Figure 4 is a perspective view showing a type of switch adapted for use in connection with the control circuits shown in Figures 1, 2, and 3.

Embodiment of Figure 1

Referring to the drawings, there is shown in Figure 1, a motor having a squirrel cage rotor 10 and a pair of spaced primary windings 12 and 14. The primary windings 12 and 14 may each consist of any number of pairs of individual coils spaced around the frame of the motor at diametrically opposite points. For example, with a two-pole motor, each of 12 and 14 comprises two coils, and for a four-pole motor, each thereof would comprise four coils. For the purpose of this disclosure, these windings are shown to be single coils, but it will be understood that all usual arrangements thereof about a motor field frame could be made.

Windings 12 and 14 are angularly displaced within the motor frame so that a phase difference between the energizing currents in the windings will produce a rotating magnetic field. For obtaining this phase difference, there is provided a reactance, indicated at 16, and preferably a capacitor. The reactance is of such size that the phase shift in the winding with which it is connected is substantially equal in electrical degrees to the displacement between the windings 12 and 14 in magnetic degrees.

A first power line L1 is connected with a common junction of windings 12 and 14, as at 18. The other terminals of windings 12 and 14 are connected by wires 20, 22, respectively, with two contacts 24 and 26 of a reversing switch, generally indicated at 28. Connected between wires 20 and 22 is the reactance 16 and in series with a normally closed centrifugal switch 30 responsive to a predetermined speed of rotation of rotor 10 in either direction for opening to interrupt the circuit through the said reactance.

Switch 30 is by-passed by a normally closed shunting switch 32 connected for actuation into its open position by armature 34 associated with solenoid 36, which is serially connected with line L1 to pass the entire motor load current therethrough.

Reversing switch 28 is arranged so that its blade 38 is alternately first in contact with contact 24 and then with contact 26. This is accomplished by an arrangement which is more fully described in connection with Figure 4, the arrangement being such that each time solenoid 40 of the reversing switch is energized, the said switch blade moves from whichever contact it is then in engagement with into engagement with the other of the contacts.

Solenoid 40 is connected between power lines L1 and L2 through the normally open push button switch 42 which is manually depressible for energizing the said solenoid. Switch 42 also includes a blade 44 connected in parallel with switch 30 and switch 32, so that depressing of switch 42 will cause blade 44 to shunt out switch 30.

Embodiment of Figure 2

Figure 2 shows a somewhat modified arrangement of a split phase capacitor motor embodying my invention. In Figure 2 the squirrel cage rotor is indicated at 10a and the primary windings at 12a and 14a. The capacitor is at 16a and the centrifugal switch in series with the capacitor at 30a.

The reversing switch, and which is similar in construction to that shown at 28 in Figure 1, is indicated at 28a and includes blade 38a corresponding to blade 38 in Figure 1, and a second blade 46.

The solenoid 40a of switch 28a is connected between power lines L1 and L2 through a push button switch 48 having a single blade. The sole function of switch 48 is to energize and de-energize 40a.

The centrifugal switch 30a is by-passed by a normally closed shunting switch 32a corresponding to switch 32 of Figure 1 and which is connected with an armature 34a having solenoid 36a. Solenoid 36a has one terminal connected with line L1 and its other terminal connected with switch blade 46. Switch blade 46, similarly to blade 38a, alternately closes on two contacts, one of which is connected by wire 20a with the side of winding 12a opposite its connection with power line L1, and the other of which is connected by wire 52 with the side of winding 14a opposite its connection with the power line L1.

The purpose of blade 46, as will be seen in connection with the description of the operation of this arrangement of my invention is to connect solenoid 36a in parallel with the auxiliary winding of the motor in both directions of operation of the motor.

Embodiment of Figure 3

In Figure 3, the squirrel cage rotor of the motor is indicated at 10b and the two primary windings at 12b and 14b. The reactance is at 16b and is in series with the centrifugal switch 30b. A normally closed shunting switch 32b is in parallel with switch 30b and is adapted for being controlled by armature 34b of solenoid 36b serially arranged in line L1.

The reversing switch for the motor is indicated at 28b and in construction corresponds with that shown at 28 in Figure 1, including a blade 38b which alternately closes on contacts 24b and 26b that are connected with the terminals of windings 12b and 14b opposite their common junction 18b. The actuating solenoid for switch 28b is at 40b and is connected between lines L1 and L2 through the normally open push button station 54.

Connected in parallel with solenoid 40b is another solenoid 56 having an armature 58 connected with blade 60 of a normally open switch connected in parallel with switches 30b and 32b. It will be evident that energization of 40b is accompanied by energization of solenoid 56, which, through its armature 58, will close blade 60 for shunting out switch 30b.

Reversing switch construction

The reversing switches shown at 28, 28a, and 28b in Figures 1, 2, and 3 may be constructed as illustrated in Figure 4.

Specifically, Figure 4 illustrates the construction employed in connection with Figure 2 and reference numerals from that figure will be applied, but it will be understood that the identical construction can be used in Figures 1 and 3, except that only one switch blade is required instead of two.

In Figure 4, the blades 38a and 46 are connected so as to move together, and a spring 62 is preferably provided for snapping the said arms into their two operative positions. A yoke 64 has pin 66 engaging the end of one of the arms so that movement of the yoke about its pivot 68 will move the arms between their two positions. Yoke 64 has the spaced pins 70 engaging substantially diametrically opposite points of a three-toothed sprocket 72 on shaft 74. Shaft 74 also carries the six-tooth ratchet 76, which is adapted for being indexed one tooth space at a time by pawl 78 on arm 80 in response to energization of solenoid 40a.

It will be evident that each time solenoid 40a is energized, ratchet 76, shaft 74, and sprocket 72 will be turned one-sixth of a revolution. This will cause whichever one of the pins 70 which is resting in a valley to then be resting on the tip of a tooth on sprocket 72, while the other such pin will be positioned within a valley. Successive energizations of solenoid 40a will thus cause yoke 64, and therethrough switch blades 38a and 46, to oscillate between their two operative positions.

Operation of the embodiment of Figure 1

The arrangement shown in Figure 1 is operated by supplying electrical energy at the proper voltage and frequency to power lines L1 and L2. Assuming the circuit to be connected as shown, winding 12 is directly across the line, while winding 14 has in series therewith reactance 16. The rotor 10 will thus commence to turn in one direction, and as it approaches its operating speed, switch 30 will open. The switch 32 was previously opened due to the current flowing in line L1, and, therefore, the opening of switch 30 will interrupt the energizing circuit through winding 14 and reactance 16, and the motor will continue operation as a single phase squirrel cage induction motor.

If now it is desired to reverse the direction of rotor 10, switch 42 is closed. Closing of switch 42 will energize solenoid 40 and bring about substantially instantaneous movement of switch blade 38 into engagement with contact 24. At the same time, blade 44 of the switch 42 shunts out switch 30, making it ineffective for interrupting the circuit through reactance 16. At this moment, winding 14 is connected directly across the line and winding 12 is connected in series with reactance 16.

The revolving field set up by windings 12 and 14 now moves opposite to the direction of rotation of rotor 10. This results in a strong brake action on rotor 10, which quickly brings it to a halt. From its halted position, of course, the rotor will be driven by the revolving field of the motor in the opposite direction until it obtains its operating speed. Inasmuch as switch 30 will close after the motor speed has been reduced a predetermined amount, it is not necessary to hold switch 42 closed until the motor has been reversed. Rather, this operation is momentary in nature, since the reversing of the motor is substantially instantaneous.

The motor now having been reversed, it will continue to run in its reversed direction until switch 42 is again closed. It will be evident that the arrangement of this invention provides for means for substantially instantaneously reversing the direction of a split phase motor at any time. It will also be evident that windings 12 and 14 are substantially identical and alternately act as running and auxiliary windings. Since these windings are substantially identical, the motor will have the same operating characteristics in both directions of rotation.

According to this invention, a braking arrangement is also provided, and this takes the form of switch 32, which is normally held open by the load current of the motor passing through solenoid 36. Upon de-energization of the motor, however, solenoid 36 will be de-energized and permit switch 32 to close. Closing of switch 32 connects windings 12, 14 and reactants 16 in closed circuit, and the residual magnetism in the rotor and field iron will set up a generator action which will quickly brake rotor 10 to a reduced speed. Normally switch 32 is open and ineffective, and only becomes operative under the circumstances set forth above after the motor has been de-energized and before centrifugal switch 30 has closed.

*Operation of the embodiment of Figure 2*

The operation of the circuit arrangement is shown in Figure 2 and is substantially identical with that shown in Figure 1, with switch 28a alternately connecting reactance 16a, first in series with one of windings 12a and 14a and then in series with the other thereof, while connecting the opposite of the windings directly across the line.

In Figure 2, however, shunting switch 32a has its actuating solenoid 36a connected through switch 28a so as always to be in parallel with the auxiliary winding. After the motor is in operation, switch 32a is normally held open because of the voltage induced in the auxiliary winding and which causes an energizing current to flow through solenoid 36a.

The motor is reversed in Figure 2 by closing switch 48, which energizes solenoid 40a and actuates switch 28a to reverse the connections of windings 12a and 14a in the same manner that they are reversed by switch 28 in Figure 1.

In Figure 2, however, actuation of switch 28a immediately de-energizes solenoid 36a, thus permitting 32a to close to shunt out switch 30a. This provides for the same braking action on the rotor as switch blade 44 provided in connection with the Figure 1 circuit arrangement. After the rotor has slowed down and reversed and begins to approach running speed, solenoid 36a is again energized to open blade 32a.

*Operation of the embodiment of Figure 3*

Operation of the embodiment shown in Figure 3 is substantially identical with that described in connection with the Figures 1 and 2 embodiments, except for the manner of shunting out centrifugal switch 30b during the reversing of the motor. In Figure 3, this is accomplished by switch 60 which moves into its closed position upon energization of solenoid 56. Solenoid 56 is energized when switch 54 is closed to bring about reversing of the motor.

It will be evident that the arrangement shown in Figure 3 is substantially identical with that shown in Figure 1, except that in Figure 1 blade 44 is manually actuated to shunt out switch 30, whereas in Figure 3, blade 60 is electrically actuated for shunting out switch 30b. In all other respects the operation of the circuit of Figure 3 is identical with that of the circuit of Figure 1.

From the foregoing, it will be observed that this invention provides for a relatively simple and inexpensive circuit arrangement applicable to single phase motors of the split phase type having an independent reactance for obtaining the phase shift between the running and starting windings of the motor. The control circuit, including the several switches and actuating solenoids, could be built directly into the motor frame, or could be provided as a separate unit for connection with a standard motor of the type described.

In any case, the control system provides a means for substantially instantaneously reversing the direction of operation of the motor at any time and also provides means for braking the motor to a halt whenever the motor is deenergized, but does not in any other way effect the operating characteristics of the motor.

It will be understood that this invention is susceptible to modification in order to adapt it to different usages and conditions, and, accordingly, it is desired to comprehend such modifications within this invention as may fall within the scope of the appended claims.

I claim:

1. A reversible induction motor having a rotatable member with a rotor winding, a pair of angularly spaced primary windings connected in parallel, a phase shifting reactance connected in series with one or the other of said windings, a speed responsive means in series with said reactance and operable in response to a predetermined speed of operation of said motor in either direction for interrupting the circuit through said reactance and the winding in series therewith, a reversing switch having two operative positions for selectively connecting said reactance in series with one or the other of said windings, electrically operable means for actuating said reversing switch, a manually operable switch having first contact means adapted to shunt said speed responsive means and second contact means for controlling said electrically operable means, said manually operable switch being adapted when closed to simultaneously shunt said speed responsive means and energize said electrically operated means to move said reversing switch from whichever position it occupies to its other position, and power line connections to said manually operable switch and said angularly spaced primary windings.

2. A reversible induction motor having a rotatable member with a rotor winding, a pair of angularly spaced primary windings connected in parallel, a phase shifting reactance connected in series with one or the other of said windings, a speed responsive switch in series with said reactance and operable in response to a predetermined speed of operation of said motor in either direction for interrupting the circuit through said reactance and the winding in series therewith, a line switch connected in parallel with said speed responsive switch, electrical means for maintaining said line switch open during operation of said motor, a reversing switch having two operative positions for selectively connecting said reactance in series with one or the other of said windings, electrically operable means for actuating said reversing switch, a manually operable switch having first contact means adapted to shunt said speed responsive switch and second contact means for controlling said electrically operable means actuating said reversing switch, said manually operable switch being adapted when closed to simultaneously shunt said speed responsive switch and energize said electrically operable means to move said reversing switch from whichever position it occupies to its other position, and power line connections to said manually operable switch and said angularly spaced primary windings.

JAMES L. TRANT.

REFERENCES CITED

The following references are of record in the file of this patent:

UNITED STATES PATENTS

| Number | Name | Date |
|---|---|---|
| 2,195,287 | Schaefer | Mar. 26, 1940 |
| 2,213,892 | West | Sept. 3, 1940 |
| 2,279,223 | Buchanan | Apr. 7, 1942 |
| 2,280,888 | Buchanan | Apr. 28, 1942 |
| 2,320,419 | Ellis | June 1, 1943 |
| 2,380,270 | Suhr et al. | July 10, 1945 |
| 2,407,117 | Warner | Sept. 3, 1946 |
| 2,403,369 | Brongersma | Oct. 1, 1946 |
| 2,425,312 | Gower | Aug. 12, 1947 |
| 2,473,244 | Fuller | June 14, 1949 |
| 2,509,898 | Wiseman | May 30, 1950 |

FOREIGN PATENTS

| Number | Country | Date |
|---|---|---|
| 319,684 | Great Britain | May 8, 1930 |